JOEL MOULTON.
Improvement in Machines for Covering Wringer Rolls.
No. 119,636. Patented Oct. 3, 1871.
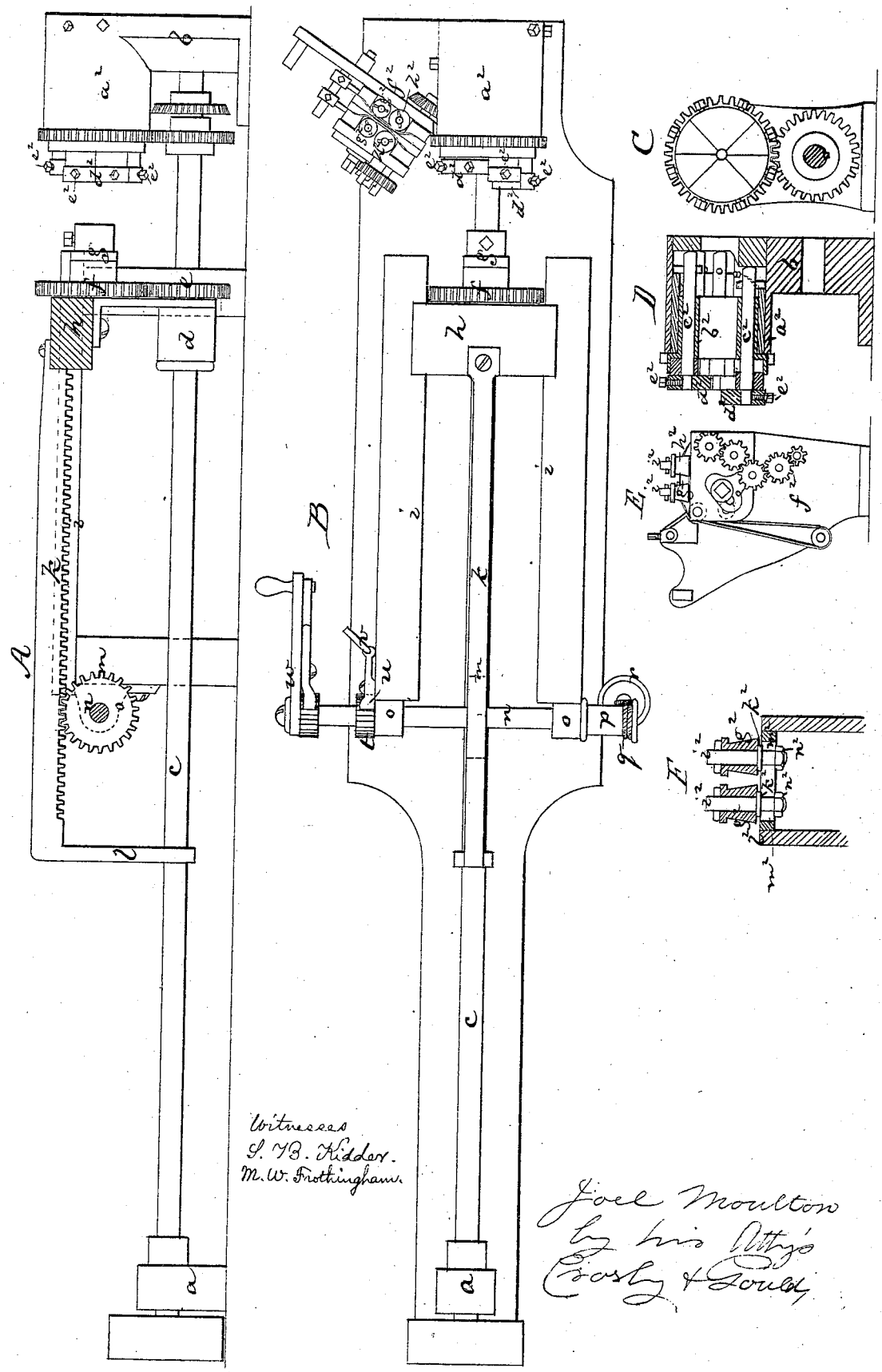

UNITED STATES PATENT OFFICE.

JOEL MOULTON, OF BOSTON, MASSACHUSETTS.

IMPROVEMENT IN MACHINES FOR COVERING WRINGER-ROLLS.

Specification forming part of Letters Patent No. 119,636, dated October 3, 1871.

*To all whom it may concern:*

Be it known that I, JOEL MOULTON, of Boston, in the county of Suffolk and State of Massachusetts, have invented an Improved Machine for Covering Wringer-Rolls, &c.; and I do hereby declare that the following, taken in connection with the drawing which accompanies and forms part of this specification, is a description of my invention sufficient to enable those skilled in the art to practice it.

United States Letters Patent No. 84,208, dated November 17, 1868, were granted to me for an improved machine for the manufacture of elastic rolls and tubes, there being shown in said patent a frame, suitably constructed for holding and rotating a metallic shaft, about which the elastic material is wound, and combined therewith a series of bunters or hammers for driving the layers or coils of rubber in close contact with each other as they are wound about the shaft, the machine further being provided with means for folding the strips of rubber previous to being wound about the shaft and of introducing into the fold thus formed a metallic wire or string.

My present invention may be said to consist in certain details of construction applicable to and pertaining to a machine having the general construction and mode of operation shown and described in such patent. In my present invention the chuck which rotates the shaft or mandrel to be covered (one end of the mandrel being secured in said chuck) is connected to the center of a sliding cross-head moving on guide-ways at its opposite ends; and to the rear side of this cross-head is fixed one end of a long gear-rack or bar, at whose opposite end is an arm, which extends down and is supported and slides freely on the driving-shaft, this gear-bar being in a vertical plane with the axis of the chuck and mandrel and nearly in axial line therewith, and a gear-pinion on a cross-shaft meshing into and actuating or controlling the movement of the bar. This arrangement of the mechanism that controls the movement of the chuck and mandrel constitutes one feature of my present invention.

In said patent there is shown a series of sliding sectoral bunters or pressers, which drive up and compact the folds of the material wound upon the mandrel, and as said material is wound, there being at the center of these sectors a hole or opening, through which the mandrel passes. In said patented machine these sectors are all made of the same size at their points, which circumscribe the mandrel, and fit, therefore, to but one size of shaft or mandrel. As, to make good work, they must fit closely to the shaft, shafts of different sizes cannot, therefore, be well wound upon one machine. To obviate this difficulty I now make the shank of each bunter with a removable head or sectoral bunter, so that, by having several series of removable bunters or heads varying in size, shafts of different sizes may be well covered, bunter-heads being used which shall fit to the circumferential surface of the particular shaft or shafts to be covered. This construction constitutes another feature of my present invention.

In said patented machine pairs of upright rolls are shown, which rolls fold the elastic band (inclosing in the bottom of the fold the metallic wire) and feed and guide or conduct the doubled or folded band to the rotating mandrel or shaft to be covered, the band being wound upon the shaft or mandrel with its inner or wired edge or fold against the surface of the mandrel, so that when wound the mandrel or roll will be covered with a band the coils of which stand at right angles to its axis. In such patent the feed and guide-rolls are fixed or rotate on stationary pins and admit or will properly feed only a fold made of one thickness of band (doubled) of elastic material. As such material is sometimes thick and sometimes thin it is desirable to have rolls so arranged that they can be made to operate properly on all thicknesses of material which may be employed to form the cover of the roll. For this purpose I make the feed and guide-rolls of one or more pairs, adjustable as to distance apart, so that by fixing them in position in accordance with the nature of the material to be wound material of any thickness may be used. This constitutes another feature of my present invention.

The drawing represents a machine embodying the improvements.

A shows a side elevation. B is a plan of it. C shows in front view the bunter-heads. D is a vertical section of the bunter-head frame. E is a side view of the guide and feed-roll mechanism for delivering the folded shaft-encompassing material to the shaft. F is a section through two of the adjustable feed or guide-rolls.

$a\ b$ denote two journal-stands, in which are journaled the opposite ends of a driving-shaft, $c$. On this shaft is a hub or sleeve, $d$, sliding upon the shaft, and splined to and rotating with and by it. At one end of this sleeve or hub is a gear, $e$, the teeth of which mesh into and drive a gear, $f$, on the chuck $g$, in which is fastened the end of the mandrel or shaft to be wound. This chuck turns on a stud-pin projecting from a cross-head, $h$, which head rests and slides on horizontal guide-rails or ways $i$. From the rear of the cross-head, and in a vertical plane with the axis of the chuck, extends the horizontal gear-bar or rack, $k$, the teeth of which are in or nearly in axial line with the center of the chuck, an arm, $l$, extending down from the rear end of the bar and riding on the shaft $c$. Engaging with the teeth of the rack is a pinion, $m$, on a cross-shaft, $n$, which shaft turns in stationary bearings $o$ and carries at one end a pulley, $p$, on which is wound a cord, $q$, having hung to it a weight, $r$, the stress of the weight tending to drive or hold the chuck up toward the bunter mechanism. The shaft also carries a ratchet-wheel, $t$, with which a spring-pawl, $u$, engages, the pawl being thrown and kept out of engagement with the ratchet, when necessary, by a bent pin, $v$, (which, when thrown under the adjacent guide-rail, raises the pawl-tooth and holds it above the ratchet-teeth,) or by any other suitable mechanism. At one end of the shaft is a handle, $w$, which turns loosely on the shaft in one direction, and by means of a pawl and ratchet rotates the shaft when turned in the other direction, or enables the shaft to be held from rotation by the stress of the weight. $a^2$ denotes the stationary hollow cylinder or case that holds the plunger or bunter mechanism, said cylinder carrying a rotary ring, $b^2$, in which slide the pins or shanks $c^2$ that bear at their front ends the sectoral bunters $d^2$. Each shank $c^2$ is shown as having a square end, upon which fits a square hole through the bunter, and each bunter is fastened upon the shank by a screw, $e^2$. All the bunters are of one size, forming at their center a concentric circle to circumscribe a shaft of corresponding diameter; but as each is made removable any set may be changed for another set shaped at their inner ends to form a circle of different diameter, so that by thus making the bunters or bunter-heads removable and by having several interchangeable sets the same machine is adapted to cover with the same perfection rolls of various sizes or diameters. The bunters are actuated as to their advance movements and their retreat in the same or substantially the same manner as in my patent No. 84,208. $f^2$ denotes the feed or delivery-roll frame, in which are mounted the rolls that conduct the folded strip or band, with the wire in the fold, to the shaft or mandrel to be covered. The arrangement of the rolls so far as relates to guiding the roll-covering material to the shaft is substantially the same as in my patent No. 84,208; but the rolls of one or of each pair of rolls $g^2\ g^2\ h^2\ h^2$ on top of the frame (by which the material is folded and the sides compressed together with the wire in the bottom of the fold) I make adjustable as to distance apart, the pins $i^2$, (see view F,) upon which the rolls turn, having each a flange or collar, $k^2$, which rests upon the top plate $l^2$, while the lower ends of the pins extend through slots $m^2$ and have nuts $n^2$ on their screw-threaded ends, the slots and nuts and flanges enabling the rolls to be brought to such distance apart as shall cause them to properly bite upon the folded band in accordance with or whatever may be the thickness of the band-forming material.

As the material is laid upon the shaft to be covered the bunters drive the coils up and compact them together, the weight $r$ acting upon the chuck through the shaft $n$, pinion $m$, gear-bar $k$, and cross-head $h$, resisting the action of the bunters, while as the shaft is progressively wound it is forced back by the action of the bunters. When the winding is finished and the wound roll removed the spring-pawl $u$ is raised from the ratchet $t$, and the cross-head will then be slid up to the bunter-cylinder by the stress of the weight $r$, its movement being controlled by the handle $w$ and its ratchet and pawl. By arranging the cross-head and gear-bar and bar-actuating mechanism as shown the sliding or end movements of the chuck are rendered free,-as the cross-head cannot be twisted or caused to bind either by the stress of the weight or by the action of the bunter mechanism. As the chucked mandrel or shaft is rotated the wire at the bottom of the fold of the elastic strip wound upon it is wound and causes the strip to be wound tightly upon the shaft, the strip and wire being held back or subjected to proper strain by the pressure of the guide-rolls $g^2\ h^2$ upon the doubled and wired strip or fold of elastic covering material.

I claim—

1. In combination with the shaft-rotating chuck or holder $g$, the sliding cross-head $h$ and the gear-rack or bar $k$, extending from the cross-head in the vertical plane of the axis of the chuck, substantially as shown and described.

2. In combination with the cross-head $h$ and gear-bar $k$, the shaft $n$ and pinion $m$, the pulley $p$ and weight $r$, ratchet and pawl $t\ u$, and the handle $w$ and its ratchet and pawl, substantially as shown and described.

3. The removable bunters or bunter-heads $d^2$ on the ends of the shanks or pins $c^2$, substantially as described.

4. The guide-rolls $g^2\ h^2$, made adjustable for materials of varying thickness, substantially as described.

JOEL MOULTON.

Witnesses:
 FRANCIS GOULD,
 M. W. FROTHINGHAM.